US006072999A

United States Patent [19]

[11] Patent Number: 6,072,999
[45] Date of Patent: Jun. 6, 2000

Konishi et al.

[54] RECEIVING APPARATUS

[75] Inventors: Takaaki Konishi, Ibaraki; Noriaki Omoto, Takatsuki; Yoshikazu Hayashi; Hiroshi Azakami, both of Ibaraki, all of Japan

[73] Assignee: Matsushita Electric Industrial Co., Ltd., Osaka, Japan

[21] Appl. No.: 08/829,978

[22] Filed: Apr. 1, 1997

[30] Foreign Application Priority Data

Apr. 1, 1996 [JP] Japan .................................... 8-078559

[51] Int. Cl.[7] ........................................................ H04B 1/10

[52] U.S. Cl. .......................... 455/286; 155/327; 155/307; 333/175; 333/202

[58] Field of Search ..................................... 455/323, 325, 455/327, 318, 319, 286, 307; 348/736; 333/174, 175, 176, 202

[56] References Cited

U.S. PATENT DOCUMENTS

| | | | |
|---|---|---|---|
| 4,340,975 | 7/1982 | Onishi et al. | 455/315 |
| 4,408,348 | 10/1983 | Theriault | 455/180 |
| 4,601,062 | 7/1986 | Hettiger | 455/285 |
| 4,619,001 | 10/1986 | Kane | 455/192 |
| 4,677,693 | 6/1987 | Takayama | 455/327 |
| 4,835,499 | 5/1989 | Pickett | 333/205 |
| 4,905,306 | 2/1990 | Anderson | 455/191 |
| 4,956,710 | 9/1990 | Pugel | 333/175 |
| 5,256,997 | 10/1993 | Inagaki | 333/175 |
| 5,392,011 | 2/1995 | Li | 333/174 |
| 5,715,531 | 2/1998 | Liu et al. | 455/307 |

FOREIGN PATENT DOCUMENTS

| | | |
|---|---|---|
| 0 193 162 | 9/1986 | European Pat. Off. . |
| 29 05 684 | 8/1979 | Germany . |
| 03 135211 | 6/1991 | Japan . |
| WO 90/13943 | 11/1990 | WIPO . |

OTHER PUBLICATIONS

European Search Report corresponding to application No. EP 97 30 2071 dated Jun. 17, 1998.

*Primary Examiner*—Reinhard J. Eisenzopf
*Assistant Examiner*—Darnell R. Armstrong
*Attorney, Agent, or Firm*—Ratner & Prestia

[57] ABSTRACT

A receiving apparatus is presented, in which a channel frequency can be selected over a wide band with an increased attenuation at an image frequency and/or at a local oscillation frequency by including a tunable filter having a following construction. Microstrip lines are connected between either one of the input or the output terminal or both of the input and output terminals of the tunable filter; a plurality of resonant circuits are formed by each of a plurality of coils and a plurality of variable capacitance diodes; and the coils are electromagnetically coupled and where a voltage applied to each cathode of each of a plurality of variable capacitance diodes through each of a plurality of resistors is controlled to tune a frequency to be received.

6 Claims, 8 Drawing Sheets

RECEIVING APPARATUS

FIELD OF THE INVENTION

The present invention relates to a receiving apparatus providing with a tunable filter for receiving waves from broadcast satellites, communication satellites or surface wave broadcasts and signals from CATV transmission.

BACKGROUND OF THE INVENTION

The receiving frequency band of a communication satellite receiver is 950 to 1770 MHz and a tunable filter for selecting a channel frequency has a circuit configuration shown in FIG. 14 which is disclosed in Japanese Patent Laid-Open 3-135211.

In FIG. 14, the tunable filter is composed of coils 4, 5, 19, 20, 21 and 22; capacitors 8 and 9; resistors 12 and 13; variable capacitance diodes 10 and 11 and the channel frequency is selected by applying a control voltage to the cathodes of variable capacitance diodes 10 and 11 through resistors 12 and 13, respectively. The frequency characteristics of the tunable filter are shown in FIG. 15, coils 19 and 21 resonsate with each of their stray capacitances and the image frequency is attenuated.

However, according to digitalization of broadcasting by broadcast satellite and communication satellite, the receiving frequency band is expanding, for example 950 to 1890 MHz in Japan and 950 to 2150 MHz in Europe.

In a usual tunable filter, it is impossible to vary the tuning frequency up to such an expanded high band frequency but if a tunable filter tunable over a wide band is composed anyway, it is difficult to work coils 19 and 21 as a trap and it becomes difficult to attenuate image frequency band. Moreover, when a channel frequency in a high band is selected, the foot of the frequency characteristic of a tunable filter becomes wider compared with when a channel frequency in a low band is selected and the exclusion ability of undesired signal decreases and the attenuation at the local oscillation frequency and the image frequency become worse compared with that at a low band channel reception. A frequency characteristic of a tunable filter in this state is shown in FIG. 13.

Therefore, it is desirable to provide a low pass filter, a trap circuit or the like, in which resonance frequency varies according to the tuning frequency, ahead of and behind the tuning filter and to attenuate the local frequency and/or the image frequency. This increases the cost of the receiver.

SUMMARY OF THE INVENTION

The present invention presents a receiving apparatus provided with a tunable filter which expands a variable range of tuning frequency and can increase the attenuation at a local oscillation frequency and/or an image frequency when a high band channel frequency is selected.

According to an exemplary embodiment of the present invention, it is possible to present a receiving apparatus which can increase the attenuation at a local oscillation frequency and/or an image frequency at a high band channel frequency selection without newly providing with a low pass filter or a trap circuit, which resonance frequency varies according to the tuning frequency, ahead of and behind the tuning filter.

An exemplary embodiment of the present invention features a tunable filter, which has fixed frequency traps at the input and/or the output in order to increase the attenuation at a local oscillation frequency and/or the attenuation at an image frequency determined by said receiving channel frequency and said local oscillation frequency when a high band channel frequency is received, in a receiving apparatus providing with a frequency converter for converting a signal of a receiving channel into an intermediate frequency signal for receiving waves from broadcast satellites, communication satellites and surface wave broadcasts and signals from CATV transmission and composing of a mixer and a local frequency oscillator which oscillation frequency is controlled by a voltage.

In a further exemplary embodiment of the present invention, the tunable filter includes a plurality of coils, a plurality of variable capacitance diodes and a plurality of microstrip lines;

- a plurality of resonant circuits composed of the plurality of coils and the plurality of variable capacitance diodes and the plurality of coils composing the plurality of resonant circuits are electromagnetically coupled;
- the plurality of microstrip lines are connected between either of the input or the output or both of the input and the output of the tunable filter and the earth potential point; and
- a receiving channel frequency is selected by applying a control voltage to each cathode of the plurality of variable capacitance diodes.

In a further exemplary embodiment of the present invention, the tunable filter includes first, second, third and fourth coils and k pieces (k=1 to m) of microstrip lines, first and second variable capacitance diodes, first and second capacitors and first and second resistors;

- k pieces of the microstrip lines are connected between the input terminal and the ground;
- a terminal of the first coil is connected to the input terminal of the tunable filter;
- the other terminal of the first coil is connected to a terminal of the second coil;
- the other terminal of the second coil is grounded;
- a terminal of the first capacitor is connected to a junction point of the first and second coils;
- the other terminal of the first capacitor is connected to a cathode of the first variable capacitance diode;
- the anode of the first variable capacitance diode is grounded;
- a control voltage is applied to a cathode of the first variable capacitance diode through the first resistor;
- a terminal of the third coil electromagnetically coupled to the second coil is grounded;
- the other terminal of the third coil is connected to a terminal of the second capacitor;
- the other terminal of the second capacitor is connected to a cathode of the second variable capacitance diode;
- the anode of the second variable capacitance diode is grounded;
- a control voltage is applied to a cathode of the second variable capacitance diode through the second resistor;
- a terminal of the fourth coil is connected to a junction point of the third coil and the second capacitor;
- the other terminal of the fourth coil is connected to the output terminal of the tunable filter; and
- a receiving channel frequency is selected by adjusting a control voltage at the cathodes of the first and second variable capacitance diodes.

In a further exemplary embodiment of the present invention, the tunable filter includes first, second, third and fourth coils and p pieces (p=1 to n) of microstrip lines, first and second variable capacitance diodes, first and second capacitors and first and second resistors;

a terminal of the first coil is connected to the input terminal of the tunable filter;

the other terminal of the first coil is connected to a terminal of the second coil;

the other terminal of the second coil is grounded;

a terminal of the first capacitor is connected to a junction point of the first and second coils;

the other terminal of the first capacitor is connected to a cathode of the first variable capacitance diode;

the anode of the first variable capacitance diode is grounded;

a control voltage is applied to a cathode of the first variable capacitance diode through the first resistor;

a terminal of the third coil electromagnetically coupled to the second coil is grounded;

the other terminal of the third coil is connected to a terminal of the second capacitor;

the other terminal of the second capacitor is connected to a cathode of the second variable capacitance diode;

the anode of the second variable capacitance diode is grounded;

a control voltage is applied to a cathode of the second variable capacitance diode through the second resistor;

a terminal of the fourth coil is connected to a junction point of the third coil and the second capacitor;

the other terminal of the fourth coil is connected to the output terminal of the tunable filter;

p pieces of the microstrip lines are connected between the output terminal of the tunable filter and the ground; and a receiving channel frequency is selected by adjusting a control voltage at the cathodes of the first and second variable capacitance diodes.

In a further exemplary embodiment of the present invention, the tunable filter includes first, second, third and fourth coils and k pieces (k=1 to m) of first microstrip lines and p pieces (p=1 to n) of second microstrip lines, first and second variable capacitance diodes, first and second capacitors and first and second resistors;

the k pieces of microstrip lines are connected between the input terminal of the tunable filter and the ground;

a terminal of the first coil is connected to the input terminal of the tunable filter;

the other terminal of the first coil is connected to a terminal of the second coil;

the other terminal of the second coil is grounded;

a terminal of the first capacitor is connected to a junction point of the first and second coils;

the other terminal of the first capacitor is connected to a cathode of the first variable capacitance diode;

the anode of the first variable capacitance diode is grounded;

a control voltage is applied to a cathode of the first variable capacitance diode through the first resistor;

a terminal of the third coil electromagnetically coupled to the second coil is grounded;

the other terminal of the third coil is connected to a terminal of the second capacitor;

the other terminal of the second capacitor is connected to a cathode of the second variable capacitance diode;

the anode of the second variable capacitance diode is grounded;

a control voltage is applied to a cathode of the second variable capacitance diode through the second resistor;

a terminal of the fourth coil is connected to a junction point of the third coil and the second capacitor;

the other terminal of the fourth coil is connected to the output terminal of the tunable filter;

the p pieces of microstrip lines are connected between the output terminal of the tunable filter and the ground; and a receiving channel frequency is selected by adjusting a control voltage at the cathodes of the first and second variable capacitance diodes.

In a further exemplary embodiment of the present invention, r pieces (r=1 to s) of coils a terminal of which is grounded and the other terminal is open are connected between the first and second coils the second coil is electromagnetically coupled to the third coil through the r pieces of coils.

In a further exemplary embodiment of the present invention, at least one of the coils is made of a microstrip line.

Each exemplary embodiment largely attenuates the signal levels at a local oscillation frequency and an image frequency at a high band channel reception.

DETAILED DESCRIPTION OF THE INVENTION

Exemplary embodiments of the present invention are explained below, referring to FIGS. 1 to 13.

(First Exemplary Embodiment)

Figure 1A:
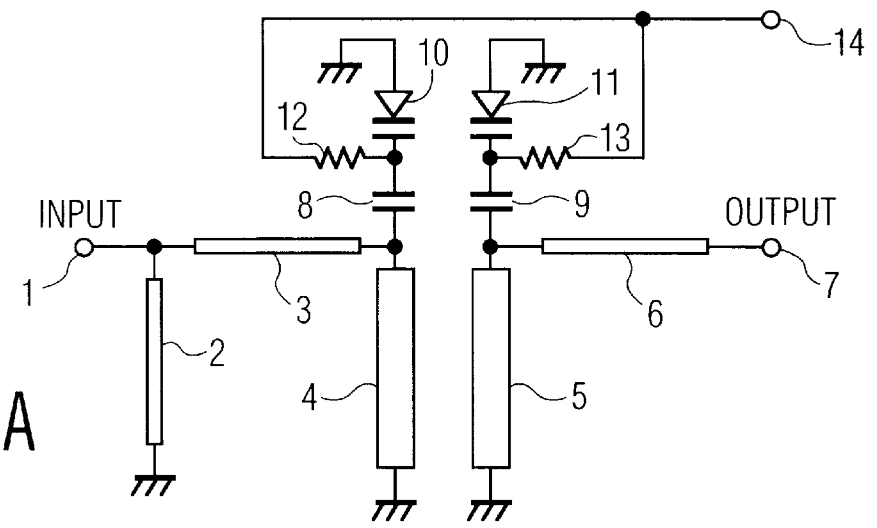
FIG. 1A is a circuit diagram of a tunable filter of a receiving apparatus in accordance with a first exemplary embodiment of the present invention.

The tunable filter shown in FIG. 1A includes microstrip lines 2, 3, 4, 5 and 6, capacitors 8 and 9, variable capacitance diodes 10 and 11 and resistors 12 and 13. The selection frequency, the passband and the attenuation at the trap frequency of the tunable filter are determined by a first resonant circuit formed by microstrip line 4, capacitor 8 and variable capacitance diode 10, a second resonant circuit formed by coil 5, capacitor 9 and variable capacitance diode 11 and a coupling between microstrip lines 4 and 5. The tuning frequency is varied over a wide band by varying a control voltage of a terminal 14 which is applied to the cathodes of variable capacitance diodes 10 and 11 through resistors 12 and 13. Microstrip lines 3 and 6 make impedance matching with the outside circuits and reduce the effect that microstrip line 2 gives to a frequency characteristic of the tunable filter. The adjustment is made by varying the length of microstrip line 2 so that the resonant frequency of microstrip line 2 is equal to a frequency to be largely attenuated.

Figure 7:
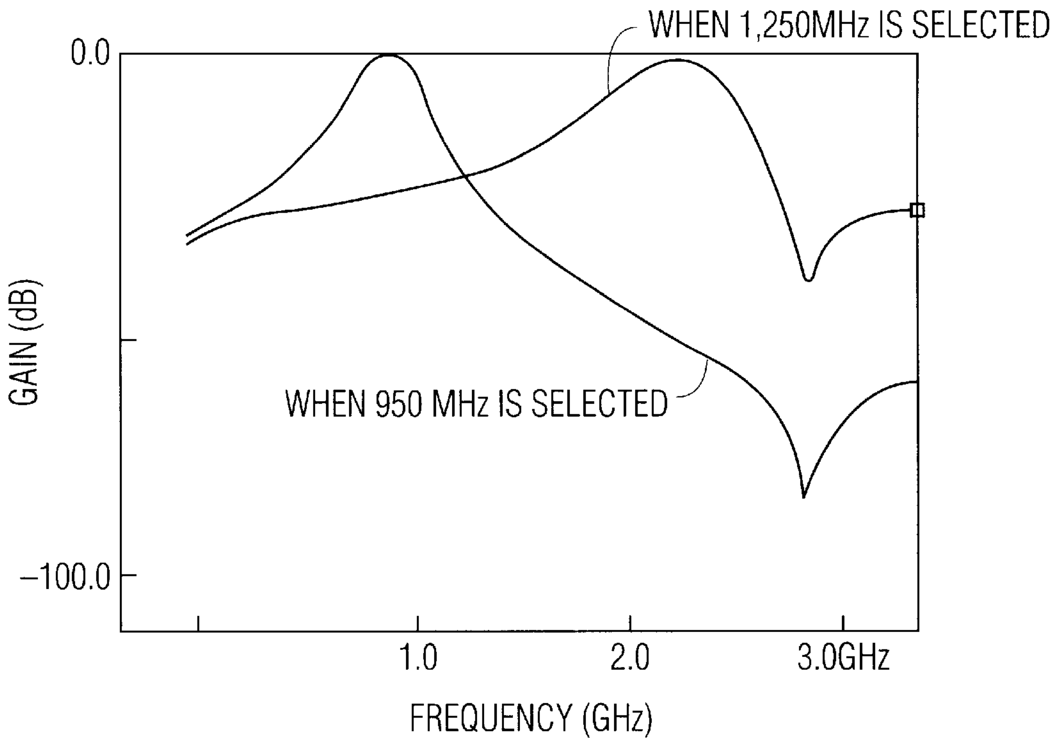
FIG. 7 is a frequency characteristic of a tunable filter of a receiving apparatus in accordance with the first exemplary embodiment of the present invention.
Figure 13:
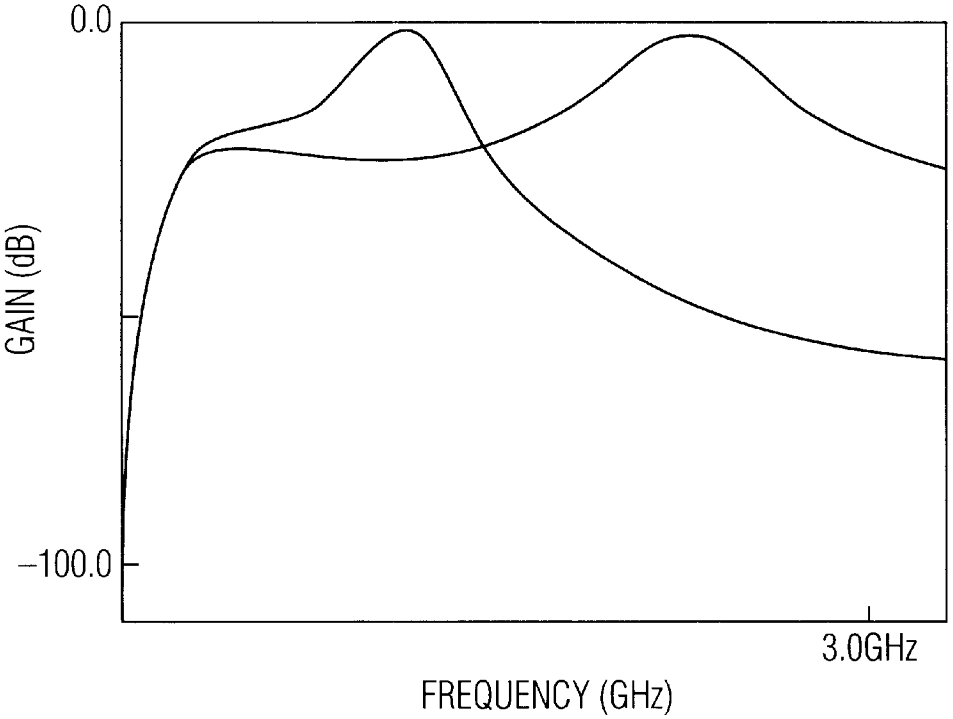
FIG. 13 (PRIOR ART)
FIG. 13 is a frequency characteristic of a tunable filter of a receiving apparatus in accordance with the prior art when the tuning range is expanded.
Figure 14:
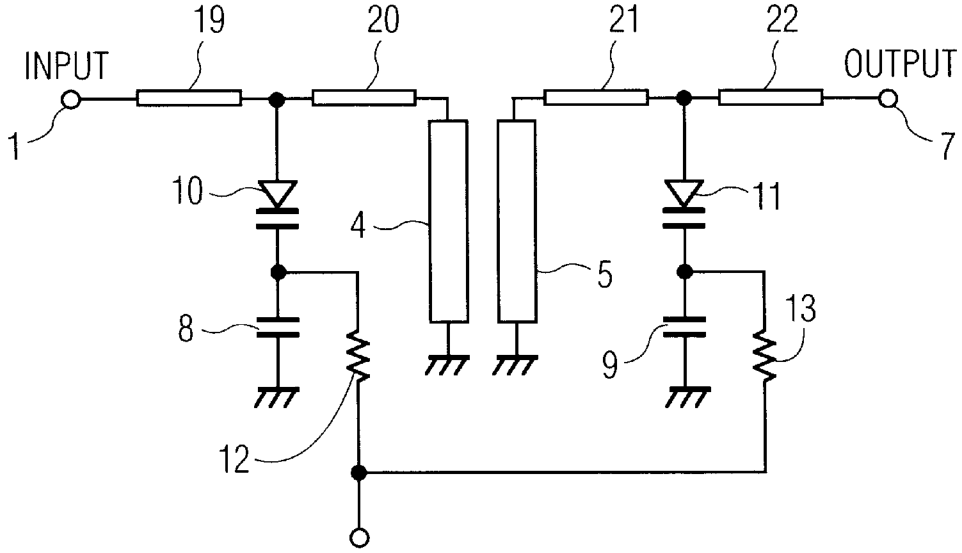
FIG. 14 (PRIOR ART)
FIG. 14 is a circuit diagram of a tunable filter of a receiving apparatus in accordance with the prior art.
Figure 15:
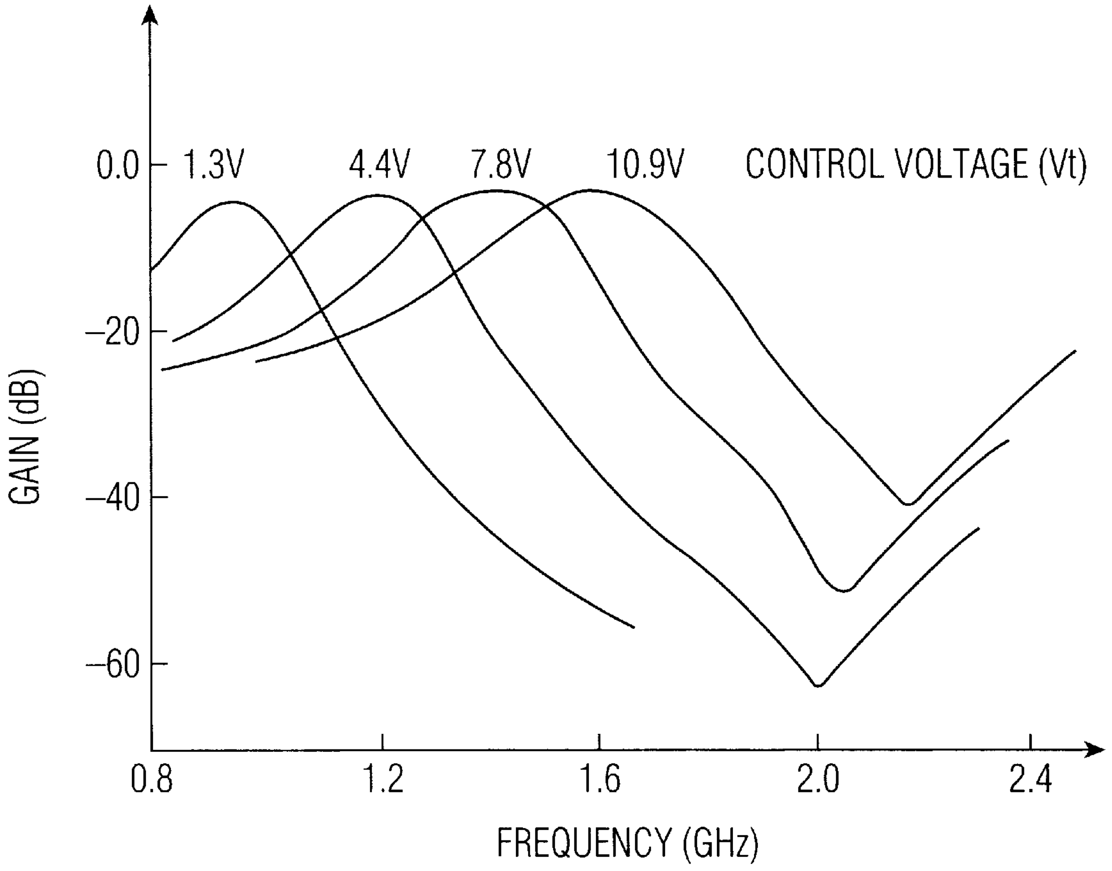
FIG. 15 (PRIOR ART)
FIG. 15 is a frequency characteristic of a tunable filter of a receiving apparatus in accordance with the prior art.

FIG. 7 shows frequency characteristics when a low band channel frequency of 950 MHz is selected and when a high band channel frequency of 2150 MHz is selected in a tunable filter circuit shown in FIG. 1. FIG. 13 shows frequency characteristics when low band channel frequency, 950 MHz is selected and high band channel frequency, 2150 MHz is selected at a circuit in which the sizes of microstrip lines 4, 5, 20 and 21 are finely adjusted so as to be variable between 950 and 2150 MHz in a circuit configuration of the prior art shown in FIG. 14.

In the case that the intermediate frequency is 479.5 MHz, when a high band channel frequency is selected, for example, when 2150 MHz is selected, the local oscillation frequency is 2629.5 MHZ and the attenuation at the local oscillation frequency is larger in a circuit of the first exemplary embodiment than that in a circuit of the prior art, as obvious comparing the characteristics shown in FIGS. 7 and 13.

Because the resonant frequency can be varied by adjusting the length of microstrip line 2, the level at the image frequency of 3109 Mhz can be also attenuated and the both levels at the local oscillation frequency and at the image frequency can be attenuated by forming microstrip line 2 in a parallel connection of plural pieces.

Figure 1B:
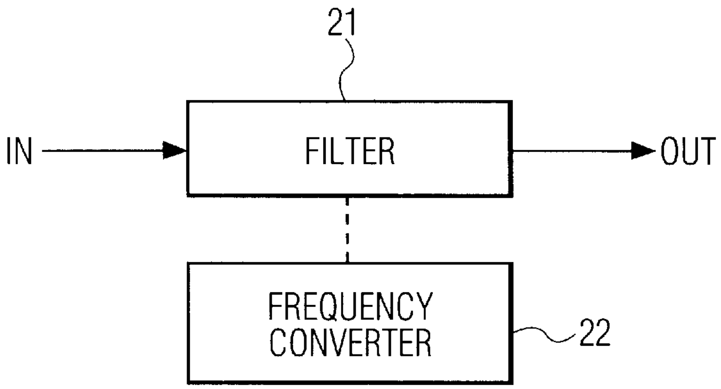
FIG. 1B is a block diagram illustrating a frequency converter with a tunable filter.

FIG. 1B is a block diagram illustrating frequency converter 32 with tunable filter 31. As shown, mixer 33 is coupled to local oscillator 34 and tunable filter 31.

(Second Exemplary Embodiment)

Figure 2:
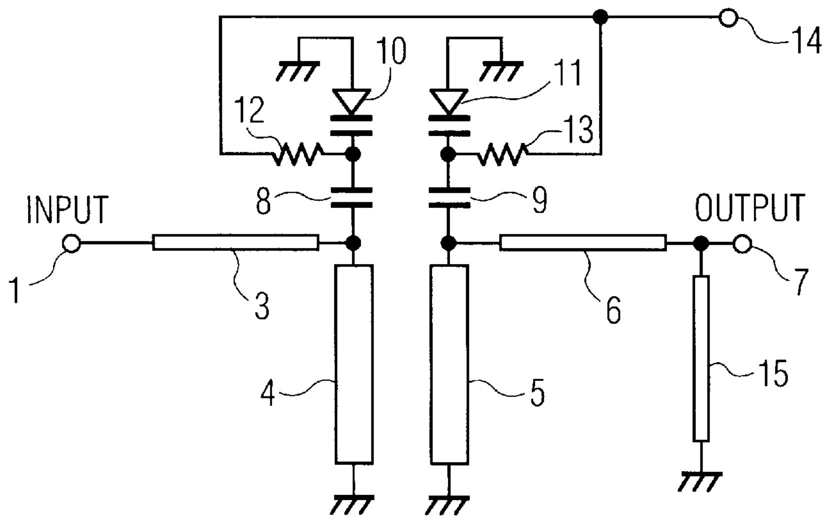
FIG. 2 is a circuit diagram of a tunable filter of a receiving apparatus in accordance with a second exemplary embodiment of the present invention.

The tunable filter shown in FIG. 2 includes microstrip lines 3, 4, 5, 6 and 15, capacitors 8 and 9, variable capacitance diodes 10 and 11 and resistors 12 and 13. The attenuations at the trap frequency, the passband and the selection frequency of the tunable filter are determined by a first resonant circuit formed by microstrip line 4, capacitor 8 and variable capacitance diode 10, a second resonant circuit formed by microstrip line 5, capacitor 9 and variable capacitance diode 11 and a coupling between microstrip lines 4 and 5. The tuning frequency is varied over a wide band by varying a control voltage at terminal 14 which is applied to the cathodes of variable capacitance diodes 10 and 11 through resistors 12 and 13. Microstrip lines 3 and 6 make impedance matching with the outside circuits and reduce the effect that coil 15 gives to a resonant characteristic of the tunable filter. The adjustment is made by varying the length of misrostrip line 15 so that the resonant frequency of misrostrip line 15 is equal to a frequency to be largely attenuated.

Figure 8:
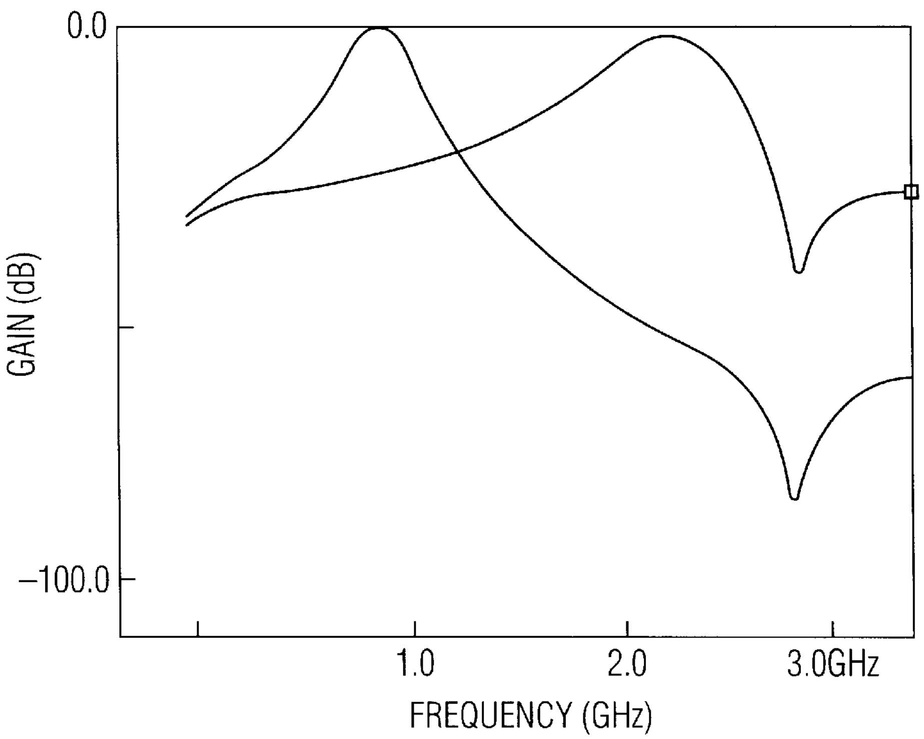
FIG. 8 is a frequency characteristic of a tunable filter of a receiving apparatus in accordance with the second exemplary embodiment of the present invention.

FIG. 8 shows frequency characteristics when a low band channel frequency of 950 MHz is selected and when a high band channel frequency of 2150 MHz is selected in a tunable filter circuit shown in FIG. 2.

In the case that the intermediate frequency is 479.5 MHz, when a high band channel frequency is selected, for example, when 2150 MHz is selected, the local oscillation frequency is 2629.5 MHZ and the attenuation at the local oscillation frequency is larger in a circuit of the second exemplary embodiment than that in a circuit of the prior art, as obvious comparing the characteristics shown in FIGS. 8 and 13.

Because the resonant frequency can be varied by adjusting the length of microstrip line 15, the level at the image frequency of 3109 MHz can be also attenuated and the both levels at the local oscillation frequency and at the image frequency can be attenuated by forming microstrip line 15 in a parallel connection of plural pieces.

(Third Exemplary Embodiment)

Figure 3:
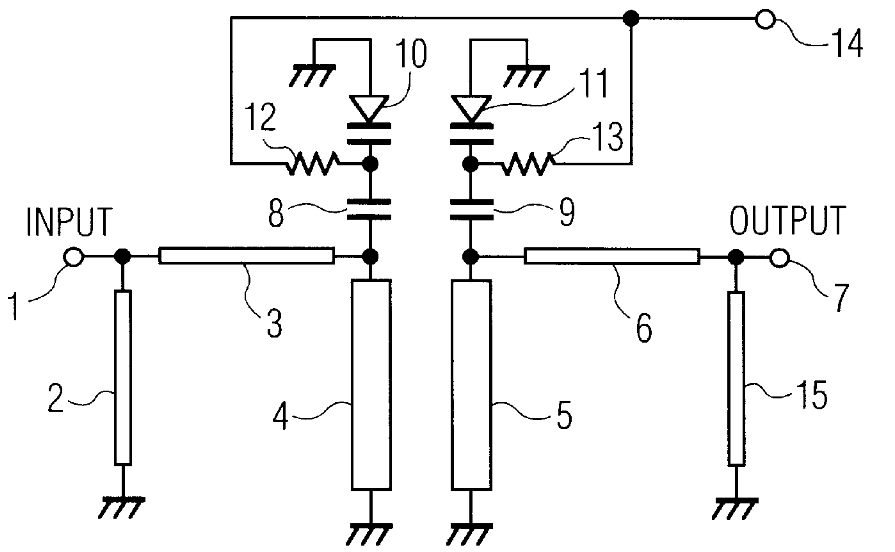
FIG. 3 is a circuit diagram of a tunable filter of a receiving apparatus in accordance with a third exemplary embodiment of the present invention.

The tunable filter shown in FIG. 3 includes microstrip lines 2, 3, 4, 5, 6 and 15, capacitors 8 and 9, variable capacitance diodes 10 and 11 and resistors 12 and 13. The attenuations at the trap frequency, the passband and the selection frequency of the tunable filter are determined by a first resonant circuit formed by microstrip line 4, capacitor 8 and variable capacitance diode 10, a second resonant circuit formed by microstrip line 5, capacitor 9 and variable capacitance diode 11 and a coupling between microstrip lines 4 and 5. The tuning frequency is varied over a wide band by varying a control voltage at terminal 14 which is applied to the cathodes of variable capacitance diodes 10 and 11 through resistors 12 and 13. Microstrip lines 3 and 6 make impedance matching with the outside circuits and reduce the effect that microstrip lines 2 and 15 give to a resonant characteristic of the tunable filter. The adjustment is made by varying the lengths of microstrip lines 2 and 15 so that the resonant frequencies of microstrip lines 2 and 15 are equal to frequencies to be largely attenuated.

Figure 9:
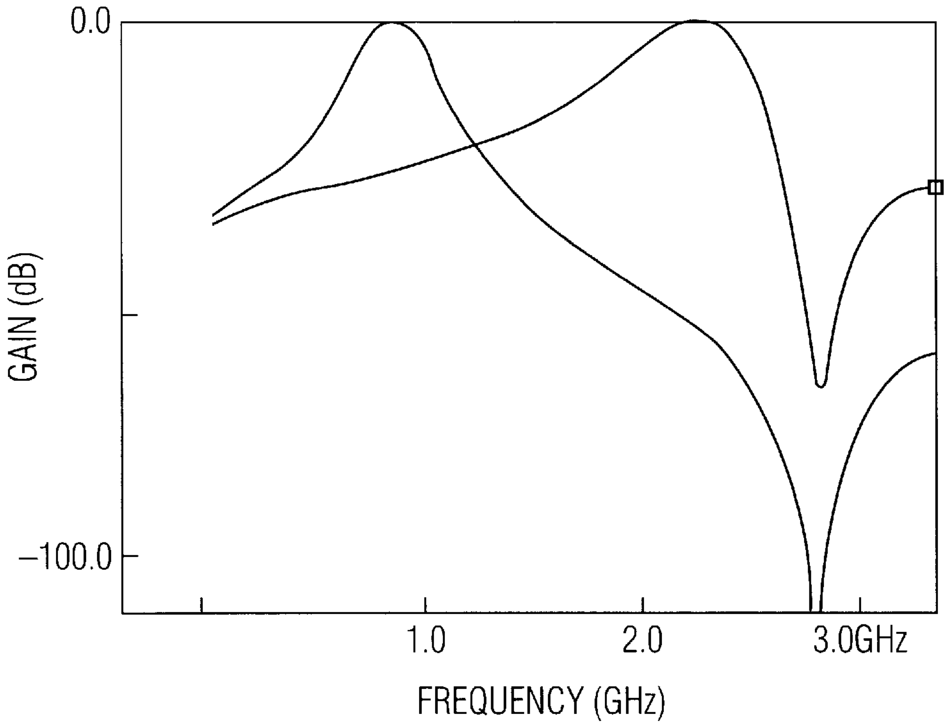
FIG. 9 is a frequency characteristics of a tunable filter of a receiving apparatus in accordance with the third exemplary embodiment of the present invention.

FIG. 9 shows frequency characteristics when a low band channel frequency of 950 MHz is selected and when a high band channel frequency of 2150 MHz is selected in a tunable filter circuit shown in FIG. 3.

In the case that the intermediate frequency is 479.5 MHz, when a high band channel frequency is selected, for example, when 2150 MHz is selected, the local oscillation frequency is 2629.5 MHz and the attenuation at the local oscillation frequency is larger in a circuit of the third exemplary embodiment than that in a circuit of the prior art, as obvious comparing the characteristics shown in FIGS. 9 and 13.

Because the resonant frequency can be varied by adjusting the lengths of microstrip lines 2 and 15, the level at the image frequency of 3109 MHz can be also attenuated and the both levels at the local oscillation frequency and at the image frequency can be attenuated by forming microstrip lines 2 and 15 in a parallel connection of plural pieces, respectively.

(Fourth Exemplary Embodiment)

Figure 4:
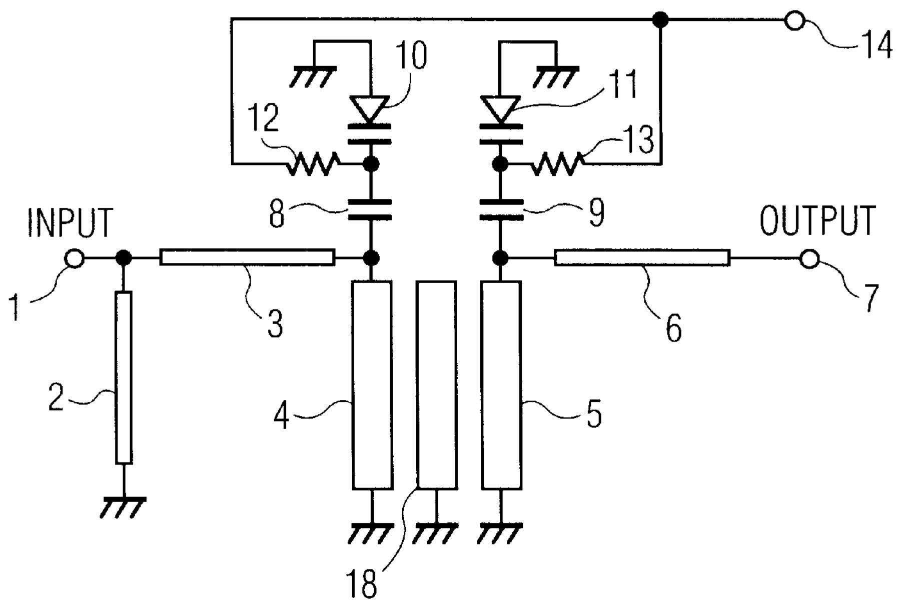
FIG. 4 is a circuit diagram of a tunable filter of a receiving apparatus in accordance with a fourth exemplary embodiment of the present invention.

The tunable filter shown in FIG. 4 includes microstrip lines 2, 3, 4, 5, 6 and 18, capacitors 8 and 9, variable capacitance diodes 10 and 11 and resistors 12 and 13. The attenuations at the trap frequency, the passband and the selection frequency of the tunable filter are determined by a first resonant circuit formed by microstrip line 4, capacitor 8 and variable capacitance diode 10, a second resonant circuit formed by microstrip line 5, capacitor 9 and variable capacitance diode 11 and a coupling between microstrip lines 4 and 5 through microstrip line 18. The tuning frequency is varied over a wide band by varying a control voltage at terminal 14 which is applied to the cathodes of variable capacitance diodes 10 and 11 through resistors 12 and 13. Microstrip lines 3 and 6 make impedance matching with the outside circuits and reduce the effect that microstrip line 2 gives to a resonant characteristic of the tunable filter. The adjustment is made by varying the length of microstrip line 2 so that the resonant frequency of microstrip line 2 is equal to a frequency to be attenuated.

The frequency characteristic of the passband becomes steep by electromagnetically coupling microstrip lines 4 and 5 through microstrip line 18 and the exclusion ability of undesired signal is improved.

Figure 10:
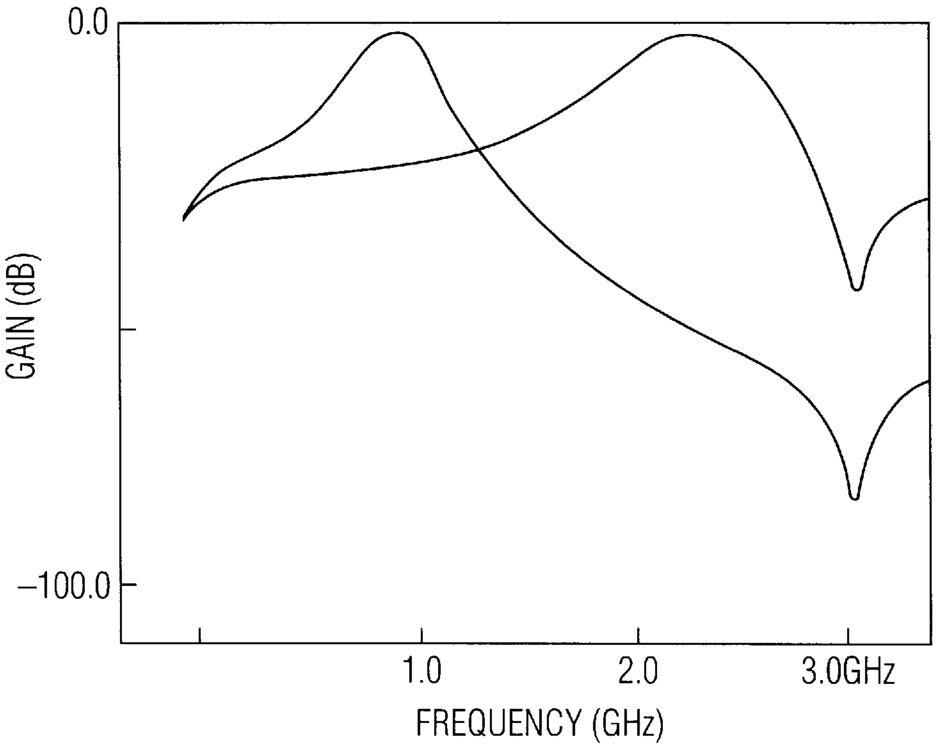
FIG. 10 is a frequency characteristic of a tunable filter of a receiving apparatus in accordance with the fourth exemplary embodiment of the present invention.

FIG. 10 shows frequency characteristics when a low band channel frequency of 950 MHz is selected and when a high band channel frequency of 2150 MHz is selected in a tunable filter circuit shown in FIG. 4.

In the case that the intermediate frequency is 479.5 MHz, when a high band channel frequency is selected, for example, when 2150 MHz is selected, the local oscillation frequency is 2629.5 MHZ and the attenuation at the local oscillation frequency is larger in a circuit of the fourth exemplary embodiment than that in a circuit of the prior art, as obvious comparing the characteristics shown in FIGS. 10 and 13.

Because the resonant frequency can be varied by adjusting the length of microstrip line 2, the level at the image frequency of 3109 MHZ can be also attenuated and the both levels at the local oscillation frequency and at the image frequency can be attenuated by forming microstrip line 2 in a parallel connection of plural pieces. Microstrip line 18 put between microstrip lines 4 and 5 can be formed by a parallel connection of plural pieces.

(Fifth Exemplary Embodiment)

Figure 5:
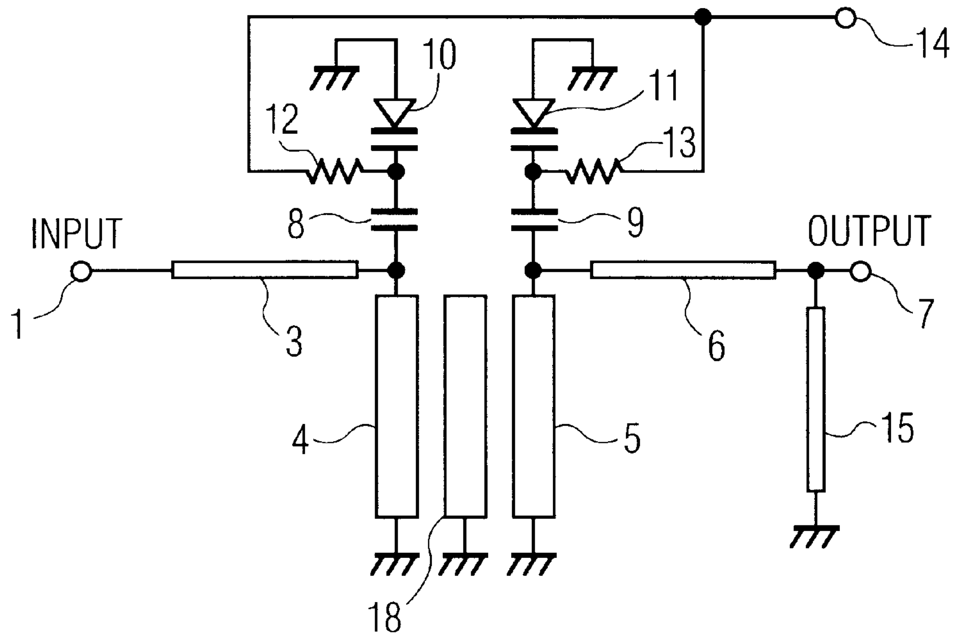
FIG. 5 is a circuit diagram of a tunable filter of a receiving apparatus in accordance with a fifth exemplary embodiment of the present invention.

The tunable filter shown in FIG. 5 includes microstrip lines 3, 4, 5, 6, 15 and 18, capacitors 8 and 9, variable capacitance diodes 10 and 11 and resistors 12 and 13. The selection frequency, the passband and the attenuation at the trap frequency of the tunable filter are determined by a first resonant circuit formed by microstrip line 4, capacitor 8 and variable capacitance diode 10, a second resonant circuit formed by microstrip line 5, capacitor 9 and variable capacitance diode 11 and a coupling between microstrip lines 4 and 5 through microstrip line 18. The tuning frequency is varied over a wide band by varying a control voltage at terminal 14 which is applied to the cathodes of variable capacitance diodes 10 and 11 through resistors 12 and 13. Microstrip lines 3 and 6 make impedance matching with the outside circuits and reduce the effect that microstrip line 15 gives to a resonant characteristic of the tunable filter. The adjustment is made by varying the length of microstrip line 15 so that the resonant frequency of microstrip line 15 is equal to a frequency to be attenuated.

Figure 11:
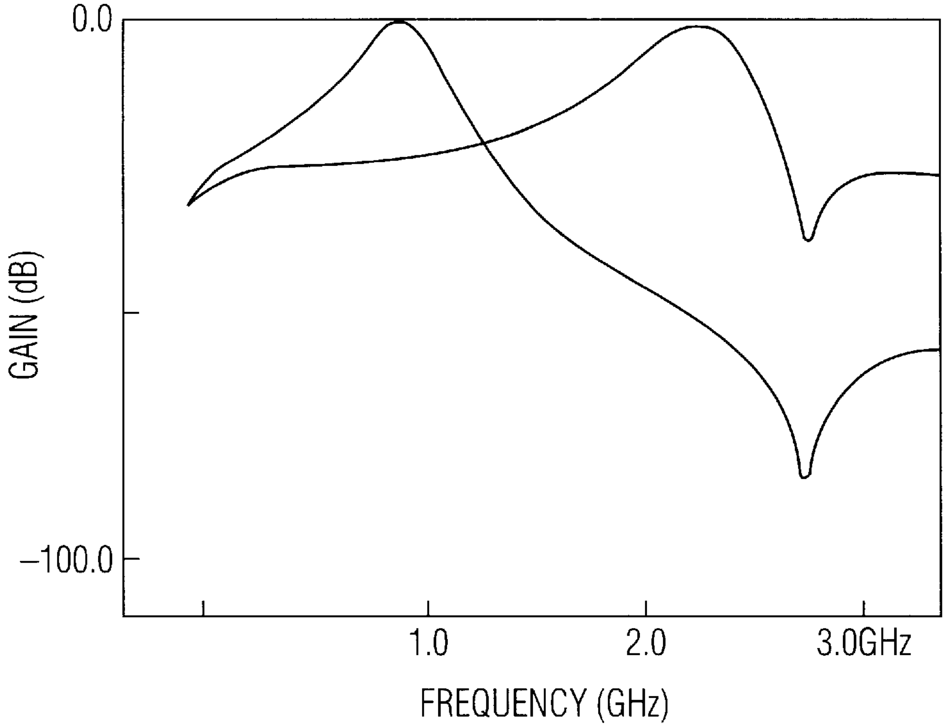
FIG. 11 is a frequency characteristic of a tunable filter of a receiving apparatus in accordance with the fifth exemplary embodiment of the present invention.

FIG. 11 shows frequency characteristics when a low band channel frequency of 950 MHz is selected and when a high band channel frequency of 2150 MHz is selected in a tunable filter circuit shown in FIG. 5.

In the case that the intermediate frequency is 479.5 MHz, when a high band channel frequency is selected, for example, when 2150 MHz is selected, the local oscillation frequency is 2629.5 MHz and the attenuation at the local oscillation frequency is larger in a circuit of the fifth exemplary embodiment than that in a circuit of the prior art, as obvious comparing the characteristics shown in FIGS. 11 and 13.

Because the resonant frequency can be varied by adjusting the length of microstrip line 15, the level at the image frequency of 3109 MHz can be also attenuated and the both levels at the local oscillation frequency and at the image frequency can be attenuated by forming microstrip line 15 in a parallel connection of plural pieces. Microstrip line 18 put between microstrip lines 4 and 5 can be formed by a parallel connection of plural pieces.

(Sixth Exemplary Embodiment)

Figure 6:
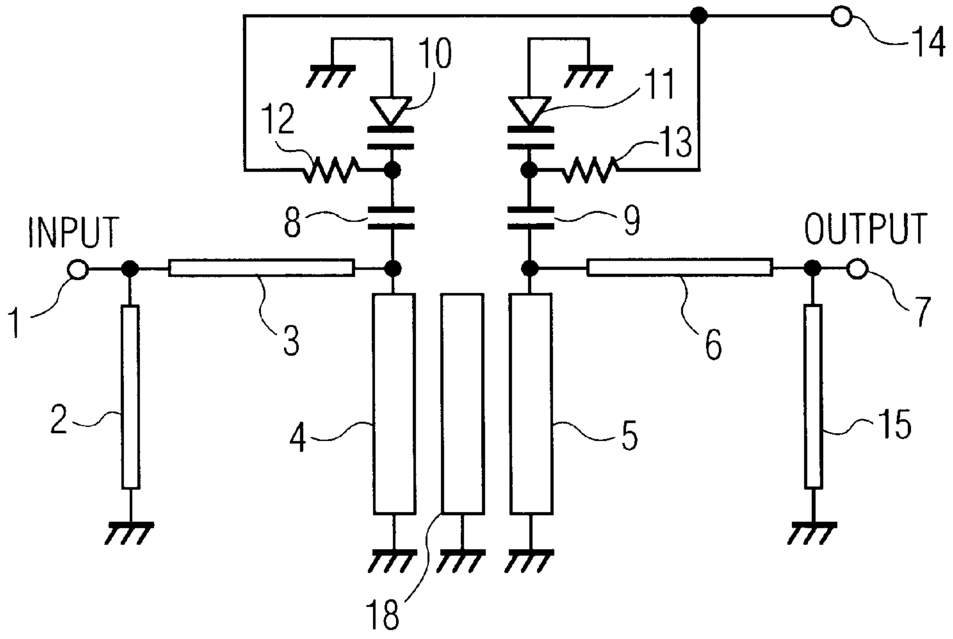
FIG. 6 is a circuit diagram of a tunable filter of a receiving apparatus in accordance with a sixth exemplary embodiment of the present invention.

The tunable filter shown in FIG. 6 includes microstrip lines 2, 3, 4, 5, 6, 15 and 18, capacitors 8 and 9, variable capacitance diodes 10 and 11 and resistors 12 and 13. The selection frequency, the passband and the attenuation at the trap frequency of the tunable filter are determined by a first resonant circuit formed by microstrip line 4, capacitor 8 and variable capacitance diode 10, a second resonant circuit formed by microstrip line 5, capacitor 9 and variable capacitance diode 11 and a coupling between microstrip lines 4 and 5 through microstrip line 18. The tuning frequency is varied over a wide band by varying a control voltage at terminal 14 which is applied to the cathodes of variable capacitance diodes 10 and 11 through resistors 12 and 13. Microstrip lines 3 and 6 make impedance matching with the outside circuits and reduce the effect that microstrip lines 2 and 15 give to a resonant characteristic of the tunable filter. The adjustment is made by varying the length of microstrip lines 2 and 15 so that the resonant frequencies of microstrip lines 2 and 15 are equal to frequencies to be attenuated.

Figure 12:
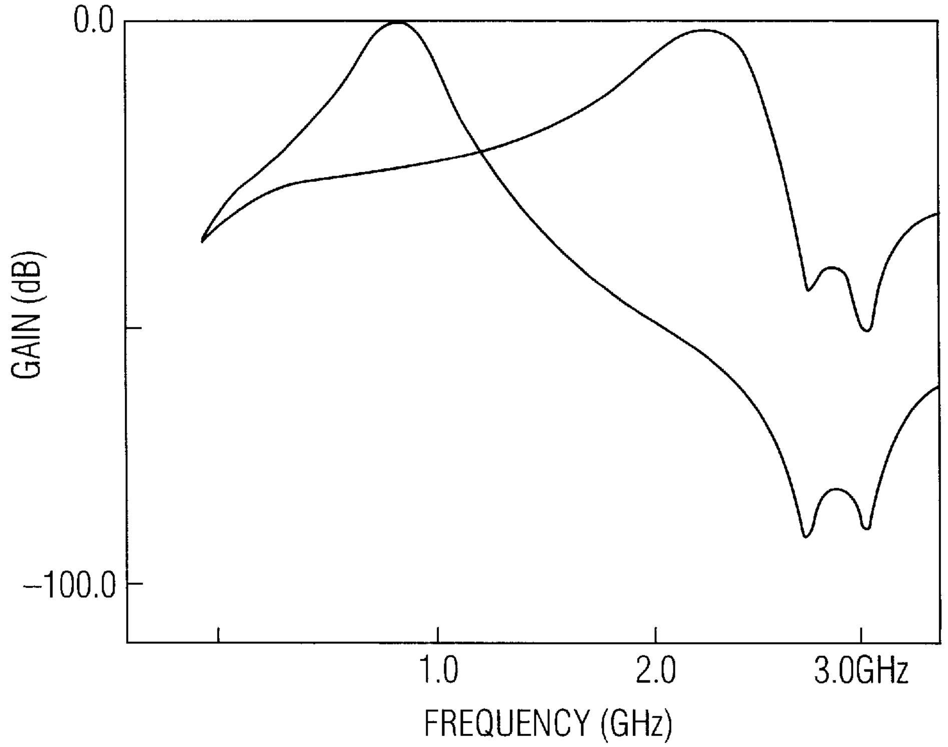
FIG. 12 is a frequency characteristic of a tunable filter of a receiving apparatus in accordance with the sixth exemplary embodiment of the present invention.

FIG. 12 shows frequency characteristics when a low band channel frequency of 950 MHz is selected and when a high band channel frequency of 2150 MHz is selected in a tunable filter circuit shown in FIG. 6.

In the case that the intermediate frequency is 479.5 MHz, when a high band channel frequency is selected, for example, when 2150 MHz is selected, the local oscillation frequency is 2629.5 MHz and the attenuation at the local oscillation frequency is larger in a circuit of the sixth exemplary embodiment than that in a circuit of the prior art, as obvious comparing the characteristics shown in FIGS. 12 and 13.

Because the resonant frequency can be varied by adjusting the lengths of microstrip lines 2 and 15, the level at the image frequency of 3109 MHz can be also attenuated and the both levels at the local oscillation frequency and at the image frequency can be attenuated by forming microstrip line 15 in a parallel connection of plural pieces. Microstrip line 18 put between microstrip lines 4 and 5 can be formed by a parallel connection of plural pieces.

Thus, according to the present invention, a receiving apparatus can be presented, which can vary the tuning frequency over a wide band and can attenuate the levels at the local oscillation frequency and/or the image frequency by connecting microstrip lines between either the input or the output or both of the input and the output of the tunable filter and the ground when a high band channel frequency is selected.

What is claimed:

1. A receiving apparatus comprising:

a frequency converter for converting a signal of a receiving channel into an intermediate frequency signal for receiving waves from broadcast satellites, communication satellites and surface wave broadcasts and signals from CATV transmission and comprising a mixer and a local oscillator which oscillation frequency is controlled by a voltage; and a tunable filter having traps of fixed tuning frequencies at the input and/or the output of said receiving apparatus in order to increase the attenuation at a local oscillation frequency outputted from said local frequency oscillator and/or the attenuation at an image frequency determined by said receiving channel frequency and said local oscillation frequency at a high band channel frequency reception;

said tunable filter comprising first, second, third and fourth coils and p pieces (p=1 to n) of microstrip lines, first and second variable capacitance diodes, first and second capacitors and first and second resistors;

one terminal of said first coil is connected to the input terminal of said tunable filter;

the other terminal of said first coil is connected to a terminal of said second coil;

the other terminal of said second coil is grounded;

one terminal of said first capacitor is connected to a junction point of said first and second coils;

the other terminal of said first capacitor is connected to the cathode of said first variable capacitance diode;

the anode of said first variable capacitance diode is grounded;

a control voltage is applied to the cathode of said first variable capacitance diode through said first resistor;

one terminal of said third coil electromagnetically coupled to said second coil is grounded;

the other terminal of said third coil is connected to a terminal of said second capacitor;

the other terminal of said second capacitor is connected to the cathode of said second variable capacitance diode;

the anode of said second variable capacitance diode is grounded;

a control voltage is applied to the cathode of said second variable capacitance diode through said second resistor;

one terminal of said fourth coil is connected to a junction point of said third coil and said second capacitor;

the other terminal of said fourth coil is connected to the output terminal of said tunable filter;

said p pieces of microstrip lines are connected between the output terminal of said tunable filter and the ground; and a channel frequency is selected by adjusting the control voltage at the cathodes of said first and second variable capacitance diodes.

2. A receiving apparatus as recited in claim 1, wherein a pieces (r=1 to s) of coils each one end of which is open and each other end is grounded are put between said second and third coils; and said second coil is electromagnetically coupled to said third coil through said r pieces of coils.

3. A receiving apparatus as recited in claim 1, wherein at least one of said coils is made of a microstrip line.

4. A receiving apparatus comprising:

a frequency converter for converting a signal of a receiving channel into an intermediate frequency signal for receiving waves from broadcast satellites, communication satellites and surface wave broadcasts and signals from CATV transmission and comprising a mixer and a local oscillator which oscillation frequency is controlled by a voltage; and a tunable filter having traps of fixed tuning frequencies at the input and/or the output of said receiving apparatus in order to increase the attenuation at a local oscillation frequency outputted from said local frequency oscillator and/or the attenuation at an image frequency determined by said receiving channel frequency and said local oscillation frequency at a high band channel frequency reception;

said tunable filter comprising first, second, third and fourth coils, k pieces (k=1 to m) of microstrip lines and p pieces (p=1 to n) of microstrip lines, first and second variable capacitance diodes, first and second capacitors and first and second resistors;

said k pieces of microstrip lines are connected between the input terminal and the ground;

one terminal of said first coil is connected to the input terminal of said tunable filter;

the other terminal of said first coil is connected to a terminal of said second coil;

the other terminal of said second coil is grounded;

one terminal of said first capacitor is connected to a junction point of said first and second coils;

the other terminal of said first capacitor is connected to the cathode of said first variable capacitance diode;

the anode of said first variable capacitance diode is grounded;

a control voltage is applied to the cathode of said first variable capacitance diode through said first resistor;

one terminal of said third coil electromagnetically coupled to said second coil is grounded;

the other terminal of said third coil is connected to a terminal of said second capacitor;

the other terminal of said second capacitor is connected to the cathode of said second variable capacitance diode;

the anode of said second variable capacitance diode is grounded;

a control voltage is applied to the cathode of said second variable capacitance diode through said second resistor;

one terminal of said fourth coil is connected to a junction point of said third coil and said second capacitor;

the other terminal of said fourth coil is connected to the output terminal of said tunable filter;

said p pieces of microstrip lines are connected between the output terminal of said tunable filter and the ground; and a channel frequency is selected by adjusting the control voltages at the cathodes of said first and second variable capacitance diodes.

5. A receiving apparatus as recited in claim 4, wherein a pieces (r=1 to s) of coils each one of which is open and each other end is grounded are put between said second and third coils; and said second coil is electromagnetically coupled to said third coil through said r pieces of coil.

6. A receiving apparatus as recited in claim 4, wherein at least one of said coils is made of a microstrip line.

* * * * *